(12) United States Patent
Jiang

(10) Patent No.: US 8,386,746 B2
(45) Date of Patent: Feb. 26, 2013

(54) STORAGE UNIT MANAGEMENT METHODS AND SYSTEMS

(75) Inventor: Pei-Jun Jiang, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 825 days.

(21) Appl. No.: 12/257,620

(22) Filed: Oct. 24, 2008

(65) Prior Publication Data

US 2010/0005270 A1  Jan. 7, 2010

(30) Foreign Application Priority Data

Jul. 3, 2008  (CN) .......................... 2008 1 0007770

(51) Int. Cl.
*G06F 12/00* (2006.01)
(52) U.S. Cl. .......................... 711/206; 711/103; 711/203
(58) Field of Classification Search .......... 711/133–136, 711/159–160
See application file for complete search history.

(56) References Cited

U.S. PATENT DOCUMENTS

| 2004/0030846 A1* | 2/2004 | Armangau et al. ........... 711/154 |
| 2005/0144360 A1* | 6/2005 | Bennett et al. ................ 711/103 |
| 2007/0033330 A1* | 2/2007 | Sinclair et al. ................ 711/103 |
| 2009/0070547 A1* | 3/2009 | Jeong et al. ................... 711/209 |
| 2009/0150646 A1* | 6/2009 | Allen et al. ................... 711/213 |

* cited by examiner

*Primary Examiner* — Christian P Chace
*Assistant Examiner* — Nicholas Simonetti
(74) *Attorney, Agent, or Firm* — McClure, Qualey & Rodack, LLP

(57) ABSTRACT

Storage unit management methods and systems are provided. The storage unit comprises a plurality of physical blocks, wherein each has one of a plurality of block type definitions. First, a sub-write command is obtained, wherein the sub-write command requests to write data to at least one logical page of a logical block. It is determined whether a candidate block having a first block type definition exists in the storage unit, wherein the logical page of the logic block cannot map to the candidate block based on the first block type definition. If the candidate block exists, the block type definition of the candidate block is transformed from the first block type definition to a second block type definition. Data is written to a specific page of the candidate block, and a mapping relationship between the logical page of the logical block and the specific page of the candidate block is recorded.

28 Claims, 12 Drawing Sheets

300

400

STORAGE UNIT MANAGEMENT METHODS AND SYSTEMS

CROSS REFERENCE TO RELATED APPLICATIONS

This Application claims priority of China Patent Application No. 200810007770.3, filed on Mar. 7, 2008, the entirety of which is incorporated by reference herein.

BACKGROUND OF THE INVENTION

1. Field of the Invention

The disclosure relates generally to management methods and systems for storage units, and, more particularly to management methods and systems adapted to non-volatile memory that manage physical blocks of the storage unit in various classifications.

2. Description of the Related Art

Non-volatile memory, like Flash memory, is widely used nowadays and it is characterized that the unit for read/write is a page, and the unit for erase is a block, and the data must be erased before write. The characteristic makes it difficult to manage the read and write commands with Logic Block Address (LBA) from the host or the applications and to translate the logic addresses into physical addresses to access the physical block of the non-volatile memory. Therefore, a translation layer is always used between the file system of the host and the non-volatile memory to manage the read and write commands from the host and to access data in the memory. In conventional storage management for a non-volatile memory, data is accessed and addressed using a page mapping mode, or a block mapping mode.

In the page mapping mode, data in the storage unit is stored in a unit of page, and has a corresponding page mapping table. In the page mapping table, the logic page number is an index, and an address of a physical page is the table entry (item content). When a storage system using the page mapping mode handles read and write commands, data pages can be located by directly querying and updating the page mapping table. In the block mapping mode, data in the storage unit is stored in a unit of block, and has a corresponding block mapping table. In the block mapping table, the logic block number is an index, and an address of a physical block is the table entry. When a storage system using the block mapping mode handles read and write commands, data pages can be located by directly querying and updating the block mapping table.

Recently, with the development of IC manufacturing technology, the page/block size has been substantially increased. Further, respective pages in each block of a high capacity storage unit, such as a NAND flash memory, cannot be randomly written, but must be written in sequence. Additionally, in the NAND flash memory, the unit for read/write is a page, and the unit for erase is a block, and data must be erased before written. Therefore, when a storage system using the block mapping mode handles a write command, a block must be first allocated, so that the requested page could be written to the allocated block. Then, other pages in the logic block which the requested page belongs to must be copied to the allocated block, and the original data in the allocated block must be erased first. Thus, write efficiency is lowered when the block size is increased, especially for those requested pages comprising hot data, which is frequently accessed by the HOST. In the page mapping mode, the data distribution is complex. When no free block can be used, the procedure of data merging for obtaining a new empty block is complicated.

Therefore, some storage management systems employ a mix mapping mode integrating the block mapping mode and the page mapping mode. In these systems, the storage unit comprises respective areas corresponding to the block mapping mode and the page mapping mode, and the use between the respective areas must be switched by the data merge procedure. Although the storage management system having the mix mapping mode can store data in a more flexible manner, in practice, however, several unutilized physical pages still exist in the physical blocks corresponding to the block mapping mode and the page mapping mode of the storage unit, such that the data distribution in the storage unit becomes complex and complicated. Similarly, the data merging also increases system loads, and decreases system efficiency.

BRIEF SUMMARY OF THE INVENTION

Storage unit management methods and systems are provided.

In an embodiment of a storage unit management method for managing a storage unit comprising a plurality of physical blocks, wherein each has one of a plurality of block type definitions, a sub-write command is obtained, wherein the sub-write command requests to write data to at least one logical page of a logical block. Next, it is determined whether a candidate block having a first block type definition exists in the storage unit, wherein the logical page of the logic block cannot map to the candidate block based on the first block type definition. If the candidate block exists, the block type definition of the candidate block is transformed from the first block type definition to a second block type definition. Following, data is written to a specific page of the candidate block, and a mapping relationship between the logical page of the logical block and the specific page of the candidate block is recorded.

An embodiment of a storage unit management system comprises a storage unit and a processing module. The storage unit comprises a plurality of physical blocks, wherein each has one of a plurality of block type definitions. The processing module obtains a first write command, wherein the sub-write command requests to write data to at least one logical page of a logical block. The processing module determines whether a candidate block having a first block type definition exists in the storage unit, wherein the logical page of the logic block cannot map to the candidate block based on the first block type definition. If the candidate block exists, the processing module transforms the block type definition of the candidate block from the first block type definition to a second block type definition, writes data to a specific page of the candidate block, and records a mapping relationship between the logical page of the logical block and the specific page of the candidate block.

Storage unit management methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Storage unit management methods and systems are provided.

Figure 1:
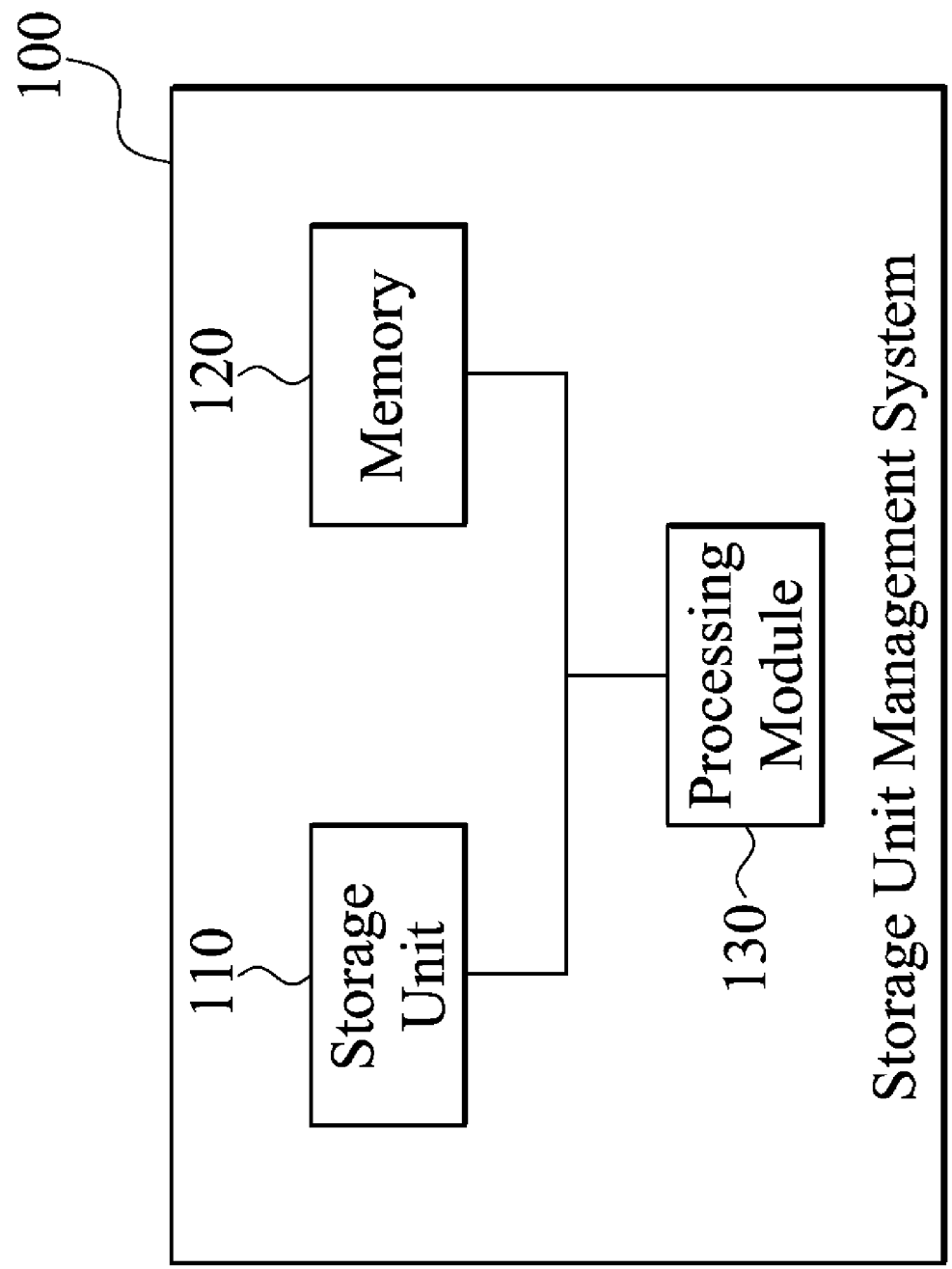
FIG. 1 is a schematic diagram illustrating an embodiment of a storage unit management system according to the invention.

FIG. 1 is a schematic diagram illustrating an embodiment of a storage unit management system according to the invention. The storage unit management system 100 comprises a storage unit 110, a memory 120, and a processing module 130.

Figure 2:
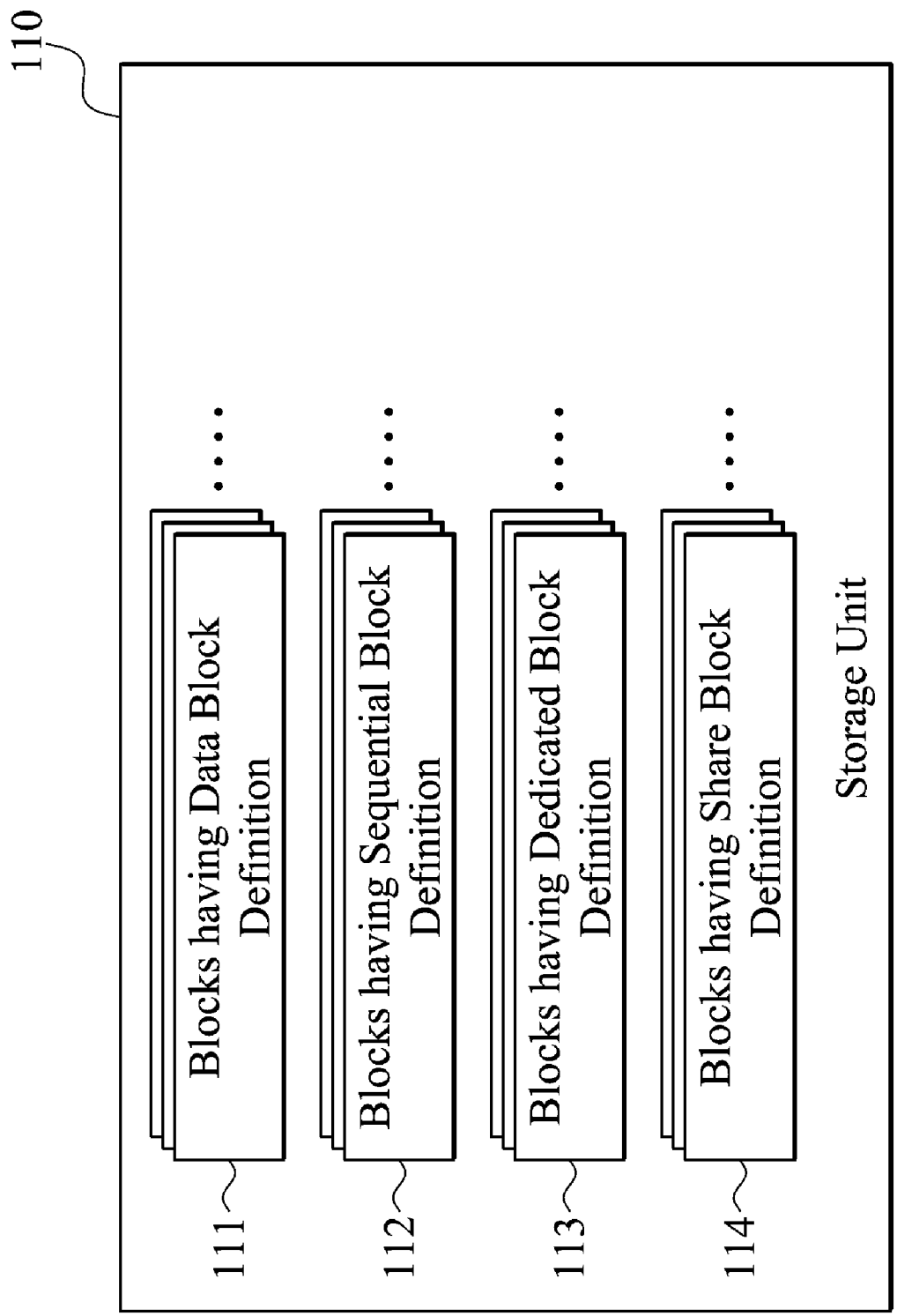
FIG. 2 is a schematic diagram illustrating an embodiment of physical blocks in a storage unit according to the invention.

The storage unit 110 may be a non-volatile memory, such as a NAND flash memory. Data in the storage unit 110 can be stored respectively using units of pages and blocks according to a page mapping mode and a block mapping mode. It is understood that, in the application, physical blocks of the storage unit 110 may have different block type definitions, thus to be managed in different classifications. FIG. 2 is a schematic diagram illustrating an embodiment of physical blocks of a storage unit 110 according to the invention. In this embodiment, the block type definitions comprise a data block definition, a sequential block definition, a dedicated block definition, and a share block definition. Each physical block in the storage unit 110 has one of the above block type definitions, and the block type definition of the physical block can be transformed among the block type definitions. The physical block 111 having the data block definition stores data according to the block mapping mode, and all pages in the physical block have been written with data. The physical block 112 having the sequential block definition stores data according to the block mapping mode in a plurality of pages from the first page, and comprises at least one page that has not been written with data. Data in the physical block 113 having the dedicated block definition corresponds to a same logic block. A plurality of pages from the first page of the physical block 113 stores data according to the block mapping mode, and the physical block 113 comprises at least one page that does not store data according to the block mapping mode. The physical block 114 having the share block definition stores data according to the page mapping mode, and the data in the physical block 114 corresponds to at least two specific logic blocks. It is understood that, the storage unit 110 may also comprise free physical blocks (not shown) that have not been assigned with any block type definition. The transformation among the block type definitions is discussed later.

Additionally, the storage unit 110 also comprises a mapping directory, a plurality of block mapping tables, a plurality of page mapped block tables, and a plurality of page mapping tables. The memory 120 may be a Random Access Memory (RAM), which stores the mapping directory, the block mapping tables, the page mapped block tables, and the page mapping tables loaded from the storage unit when the storage unit management system 100 normally operates. The mapping directory, the block mapping tables, the page mapped block tables, and the page mapping tables are further explained below.

Figure 3:
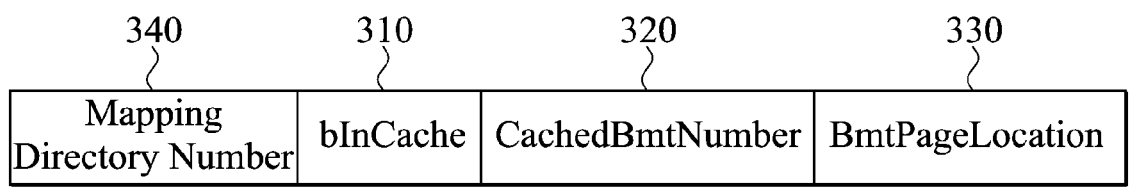
FIG. 3 is a schematic diagram illustrating an embodiment of an entry format of a mapping directory according to the invention.

FIG. 3 is a schematic diagram illustrating an embodiment of an entry format of a mapping directory according to the invention. The mapping directory is a root directory mapping user data. The mapping directory comprises several such entries, and each entry points to a page (block mapping table page) of a part of the block mapping tables corresponding to a predefined size, such as 256 MB of user data. As shown in FIG. 3, the mapping directory entry 300 comprises a 'MappingDirectoryNumber' field 340, a 'bInCache' field 310, a 'CachedBmtNumber' field 320, and a 'BmtPageLocation' field 330. The 'MappingDirectoryNumber' field 340 records a mapping directory number used as an index for the entry 300. The 'bInCache' field 310 indicates whether a corresponding block mapping table page has been loaded from the storage unit 110 to the memory 120. For example, when the block mapping table page has been loaded in the memory 120, the 'bInCache' field 310 records '1'. And when the block mapping table page has not been loaded in the memory 120, the 'bInCache' field 310 records '0'. For the block mapping table page that has been loaded in the memory 120, the 'CachedBmtNumber' field 320 records an address of the block mapping table page in the memory 120. For the block mapping table page not in the memory 120, the 'CachedBmtNumber' field 320 records 'Invalid', and the physical address of the block mapping table page in the storage unit 110 is recorded in the 'BmtPageLocation' field 330.

Figure 4:
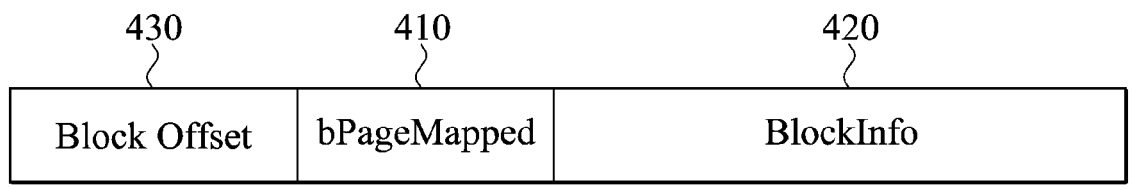
FIG. 4 is a schematic diagram illustrating an embodiment of an entry format of a block mapping table according to the invention.

FIG. 4 is a schematic diagram illustrating an embodiment of an entry format of a block mapping table according to the invention. The block mapping table comprises several such entries. A logic block offset can be used as an index for the entries in the block mapping table, wherein each entry can record storage location information corresponding to the logic block. As shown in FIG. 4, a block mapping table entry 400 comprises a 'BlockOffset' field 430, a 'bPageMapped' field 410 and a 'BlockInfo' field 420. The 'BlockOffset' field 430 records a block offset as an index for the entry 400. As described above, data in the storage unit 110 can be stored using the block mapping mode or the page mapping mode. Therefore, the 'bPageMapped' field 410 is used to indicate the mapping mode used by a logic block that owns the block mapping table. For example, when the logic block uses the block mapping mode, the 'bPageMapped' field 410 records '0'. When the logic block uses the page mapping mode, the 'bPageMapped' field 410 records '1'. The 'BlockInfo' field 420 records detailed mapping information. For the logic block using the block mapping mode, the 'BlockInfo' field 420 records the physical location, such as a physical block number corresponding to a data block. For the logic block using the page mapping mode, the 'BlockInfo' field 420 records a page mapped block number, that indicates which of the page mapped blocks, is the logic block.

Figure 5:
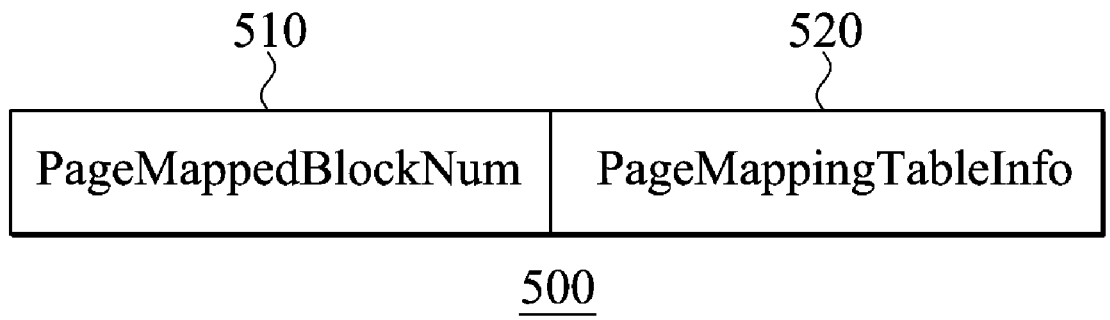
FIG. 5 is a schematic diagram illustrating an embodiment of an entry format of a page mapped block table according to the invention.

FIG. 5 is a schematic diagram illustrating an embodiment of an entry format of a page mapped block table according to the invention. The page mapped block table comprises several such entries. A page mapped block number can be used as an index for the entries in the page mapped block table, and each entry can record a beginning address of a page mapping table corresponding to the logic block in the memory 120. As shown in FIG. 5, the page mapped block table entry 500 comprises a 'PageMappedBlockNum' field 510 and a 'PageMappingTableInfo' field 520. The 'PageMappedBlock-Num' field 510 records a page mapped block number, which is corresponding to the data recorded in the 'Blockinfo' field 420 of the block mapping table entry 400 when the logic block using the page mapping mode. And the 'PageMappingTableInfo' field 520 records a beginning address of a page mapping table corresponding to the logic block in the memory 120.

Figure 6:
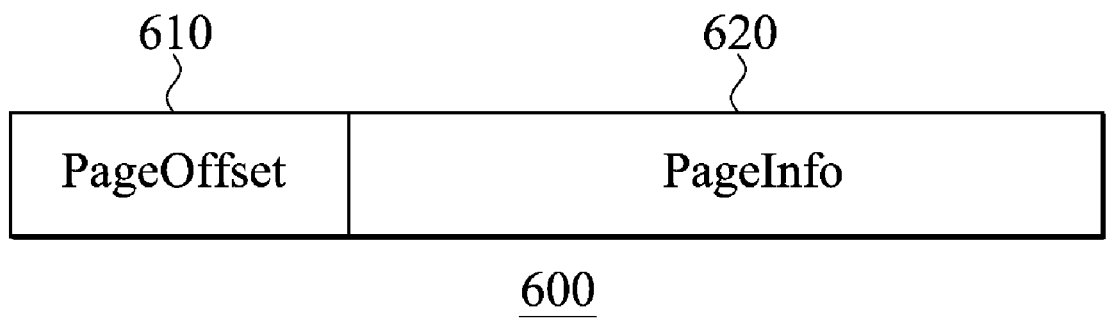
FIG. 6 is a schematic diagram illustrating an embodiment of an entry format of a page mapping table according to the invention.

Every page mapped block owns a page mapping table, which is addressed by the 'PageMappingTableInfo' field 520. FIG. 6 is a schematic diagram illustrating an embodiment of an entry format of a page mapping table according to the invention. The page mapping table comprises several such entries. A page offset can be used as an index for the entries in the page mapping table, and each entry can record a physical storage location, such as a device number, a physical block number, and a physical page offset of a logic page corresponding to the page mapped logic block. As shown in FIG. 6, the page mapping table entry 600 comprises a 'PageOffset' field 610 and a 'PageInfo' field 620. The 'PageOffset' field 610 records the page offset as an index, and the 'PageInfo' field 620 records a physical storage location of the logic page corresponding to the logic block. It is noted that, in some embodiments, the number of entries in the page mapping table equals to the number of pages contained in a logic block.

Now referring back to FIG. 1. The processing module 130 can receive a write command from an upper layer, such as an application in the host, and decompose the write command into at least one sub-write command in a unit of a page. The processing module 130 converts the sub-write command into a write command to access the physical page in the storage unit 110 with Logic Block Address (LBA) according to the mapping directory, the block mapping table, the page mapped block table, and the page mapping table, and performs the write command and transforms the block type definition of the physical block, thus to write data to a specific page of a specific physical block in storage unit 110.

FIGS. 7A~7D are flowcharts of an embodiment of a storage unit management method according to the invention.

Figure 8:
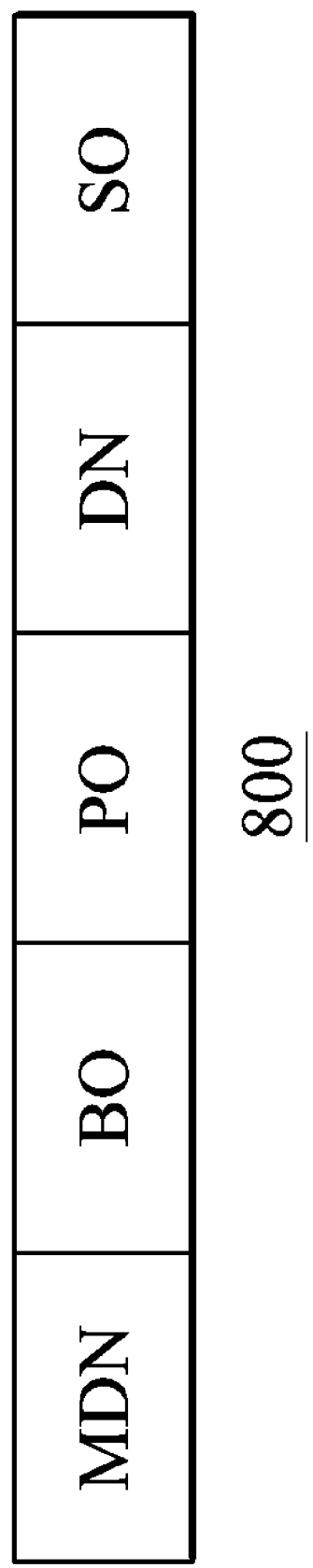
FIG. 8 is a schematic diagram illustrating an embodiment of a format of a write command according to the invention.

In step S702 (FIG. 7A), a write command is received from an upper layer, such as an application, and in step S704, the received write command is decomposed into at least one sub-write command in the unit of logic page. The sub-write command may embody a Logic Block Address (LBA) comprising mapping directory number, block offset, page offset, device number, and/or a sector offset. FIG. 8 is a schematic diagram illustrating an embodiment of a format of a Logic Block Address (LBA) embodied in the sub-write command according to the invention. As shown in FIG. 8, the Logic Block Address (LBA) 800 comprises an 'MDN' field, a 'BO' field, a 'PO' field, a 'DN' field, and an 'SO' field, wherein the 'MDN' field records the mapping directory number, the 'BO' field records the block offset, the 'PO' field records the page offset, the 'DN' field records the device number, and the 'SO' field records the sector offset. It is noted that, at least one logic page of a logic block requested to be written data can be identified using the sub-write command. In step S706, a specific block mapping table is located from a plurality of block mapping tables of the mapping directory according to the 'MDN' field in the sub-write command. In step S708, it is determined whether the specific block mapping table is in the memory. It is noted that, the determination in step S708 can be performed according to the data in the 'bInCache' field 310 of the entry 300 (shown in FIG. 3) corresponding to the mapping directory number in the LBA 800. If the specific block mapping table is not in the memory (No in step S708), in step S710, a candidate block mapping table is selected from the block mapping tables in the memory, and in step S712, the specific block mapping table is loaded to the memory to replace the candidate block mapping table. It is understood that, in some embodiments, the selection of the candidate block mapping table is performed only when there is not enough memory space, and the candidate block mapping table is selected according to an LRU (Least Recently Used) algorithm. If the memory still has available space, the specific block mapping table can be directly loaded to the memory. After loading the specific block mapping table, then go to step S714.

If the specific block mapping table is in the memory (Yes in step S708), also go to step S714. In step S714, a first specific entry (e.g. a block mapping table entry 400 shown in FIG. 4) is located from the specific block mapping table according to the block offset (data in the 'BO' field) in the LBA 800 of the sub-write command. The first specific entry comprises a mapping mode setting (data in the 'bPageMapped' field 410) and block information (data in the 'BlockInfo' field 420). In step S716, it is determined whether the mapping mode corresponding to the block is the page mapping mode according to the mapping mode setting. If the mapping mode is the block mapping mode (No in step S716), then goes to step S718. In step S718, it is determined whether any free entry (e.g. page mapped block table entry 500 shown in FIG. 5) exists in the page mapped block table. If a free entry exists in the page mapped block table (Yes in step S718), the procedure goes to step S722. If no free entry exists in the page mapped block table (No in step S718), in step S720, data merge for pages is performed to obtain at least one free entry (like the page mapped block table entry 500) from the page mapped block table. In step S722, the free entry corresponding to the sub-write command is added to the page mapped block table, and the procedure goes to step S724. If the mapping mode is the page mapping mode (Yes in step S716), also goes to step S724. In step S724, a second specific entry (e.g. page mapped block table entry 500) is located from a page mapped block table according to the block information (page mapped block number in the 'BlockInfo' field 420) in the first specific entry, and in step S726, a specific page mapping table is located corresponding to the specific page mapped block according to the second specific entry.

After the specific page mapping table is located, it is determined whether a candidate block having a block type definition (shown in FIG. 2) exists in the storage unit 110. That is to determine whether a candidate block having a first block type definition exists in the storage unit 110, wherein the logical pages of the logic block cannot map to the candidate block based on the first block type definition. "cannot map to the candidate block" means, for example, the situation that the first block type definition is the sequential block definition 112 as shown in FIG. 2, and the requested logic pages comprises the first page of the corresponding logic block. In such situation, the data to be written cannot map to the candidate block. "cannot map to the candidate block" also means, for example, the situation that the first block type definition is the sequential block definition 112 as shown in FIG. 2, and the LBA of the requested logic page is not continuous with the LBA of the last page among the pages with data in the candidate block. In such situation, because the physical block having the sequential block definition stores data according to the block mapping mode, which means the LBA of the physical pages in the block should be continuous, the data to be written cannot map to the remnant empty pages of the candidate block.

When the logical pages of the logic block cannot map to the candidate block based on the first block type definition, the block type definition of the candidate block is transformed from the first block type definition to a second block type definition, for example, transformed from the sequential block definition 112 to the dedicated block definition 113, or transformed from the dedicated block definition 113 to the share block definition 114 as shown in FIG. 2. And then the data is written to a specific page of the candidate block. The detailed descriptions could be referred to the descriptions of FIG. 7A to FIG. 7D.

Figures 1, 7A:
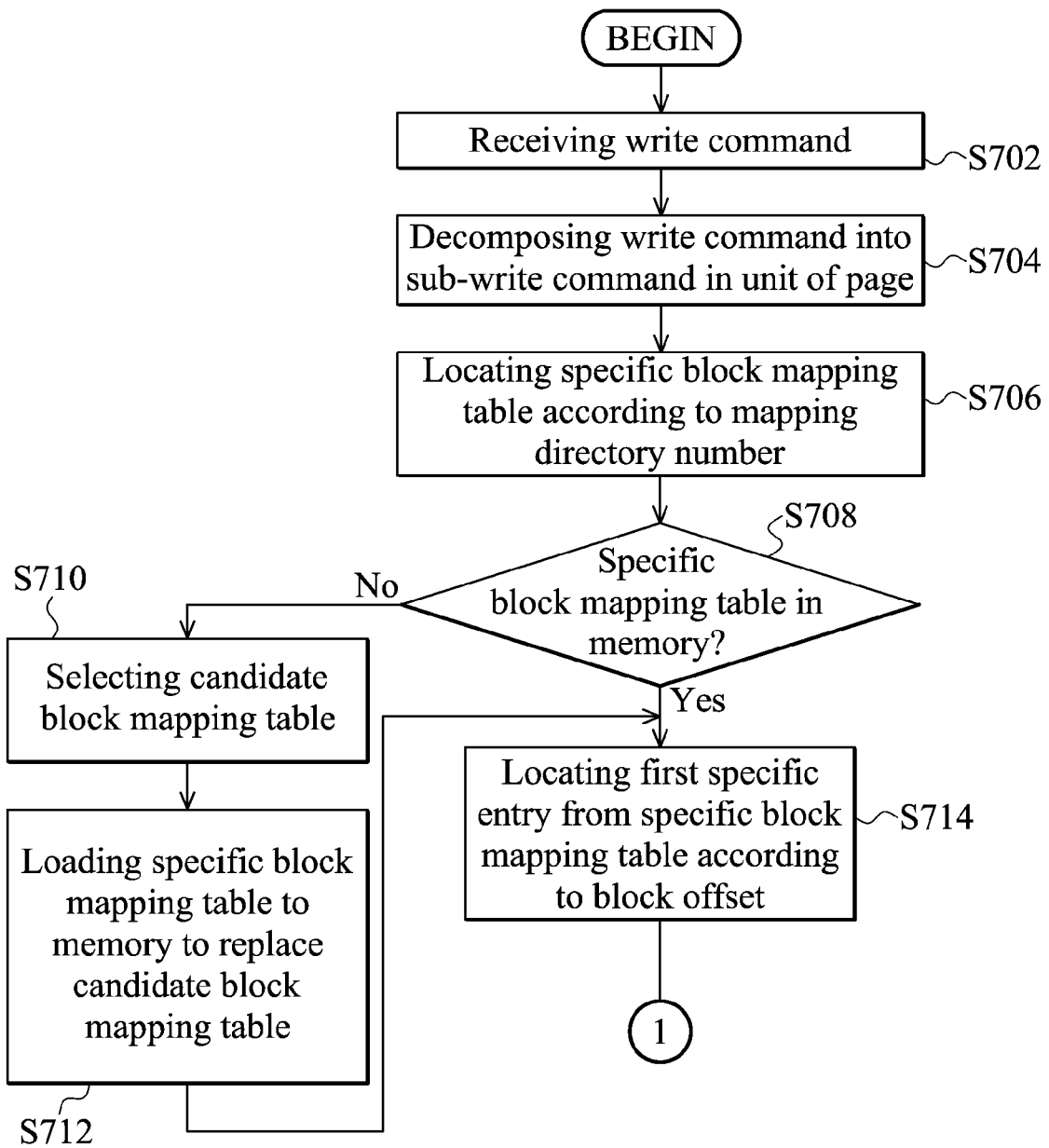
FIGS. 7A-7D are flowcharts of an embodiment of a storage unit management method according to the invention.
Figures 2, 7A:
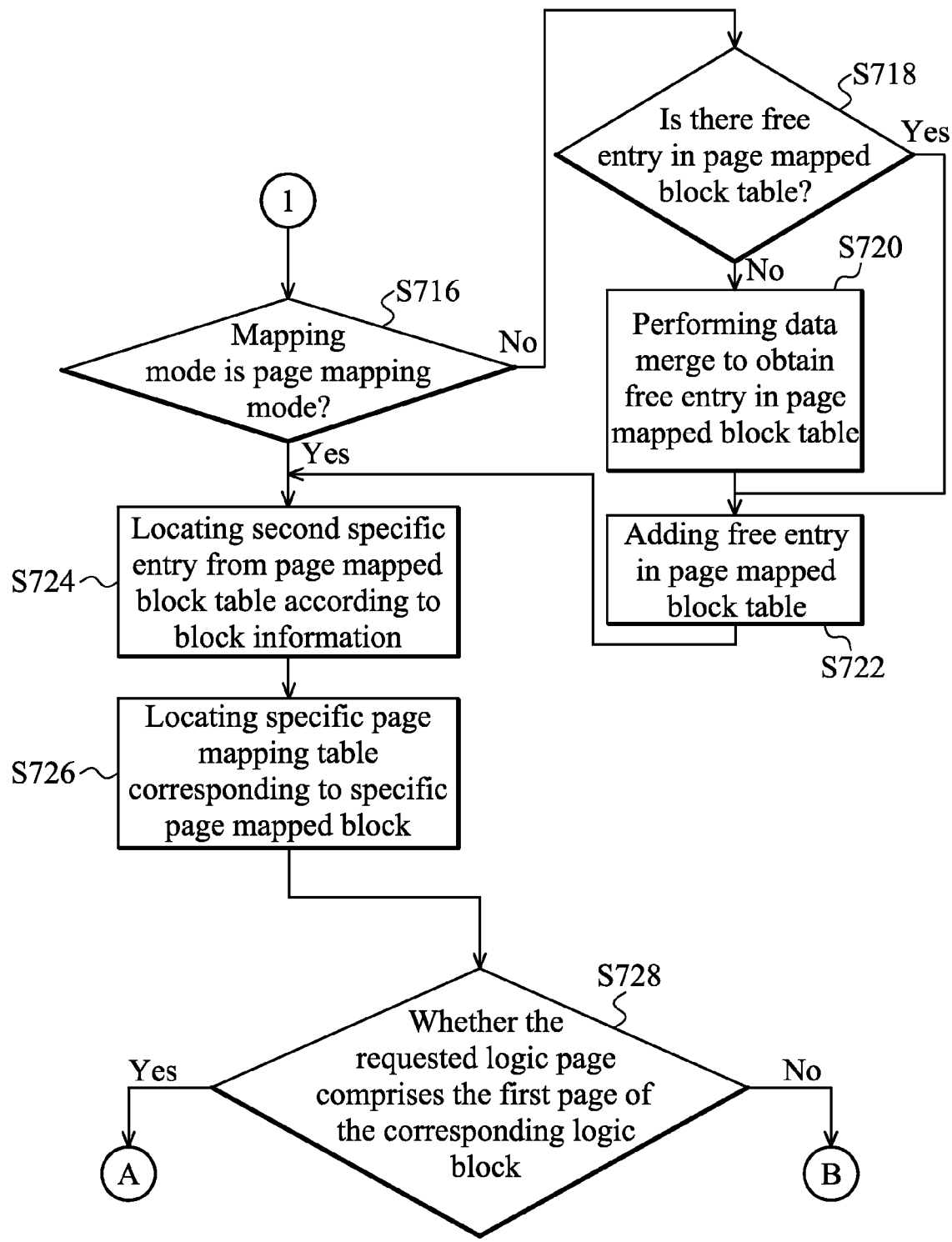
Figures 1, 7B:
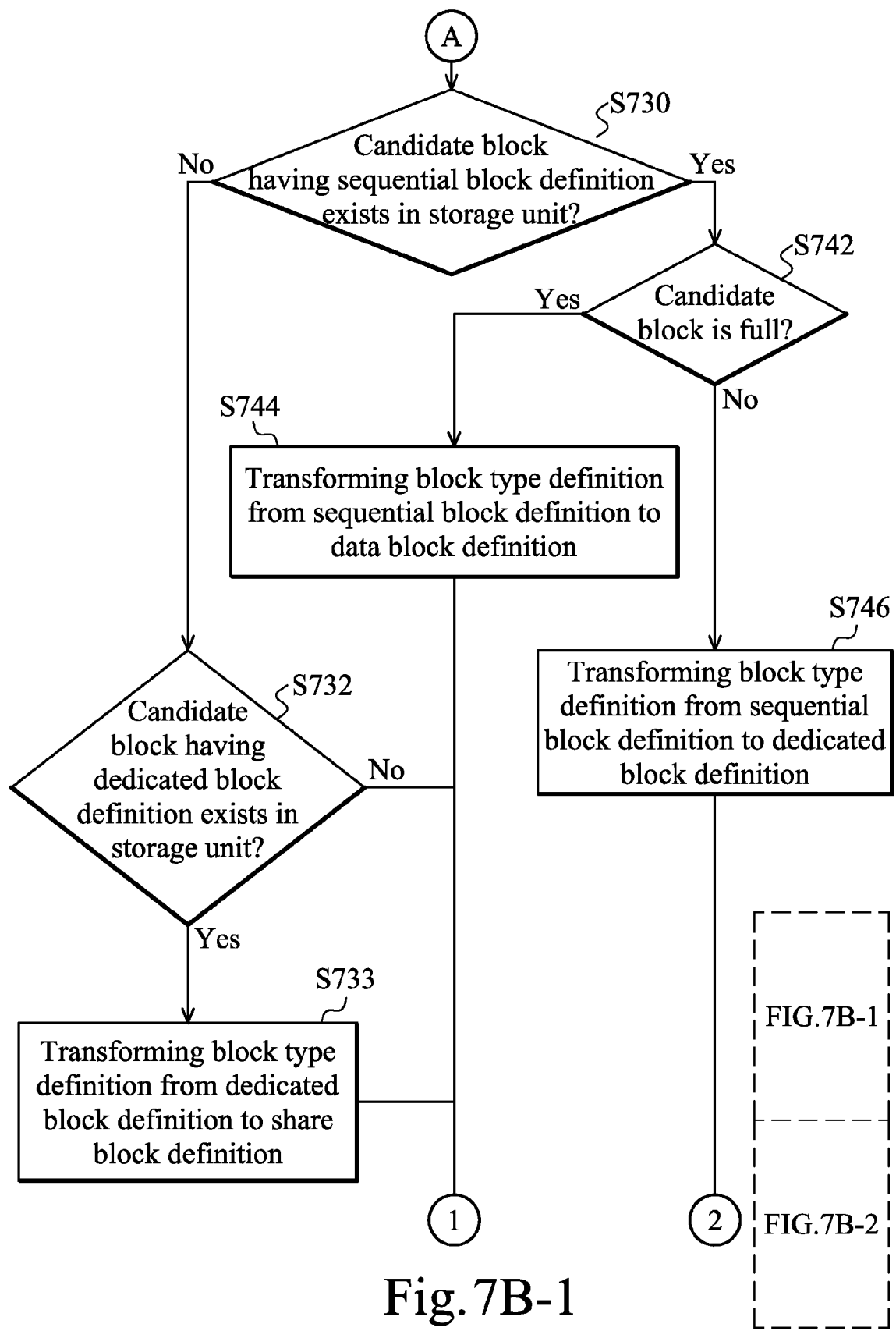
Figures 2, 7B:
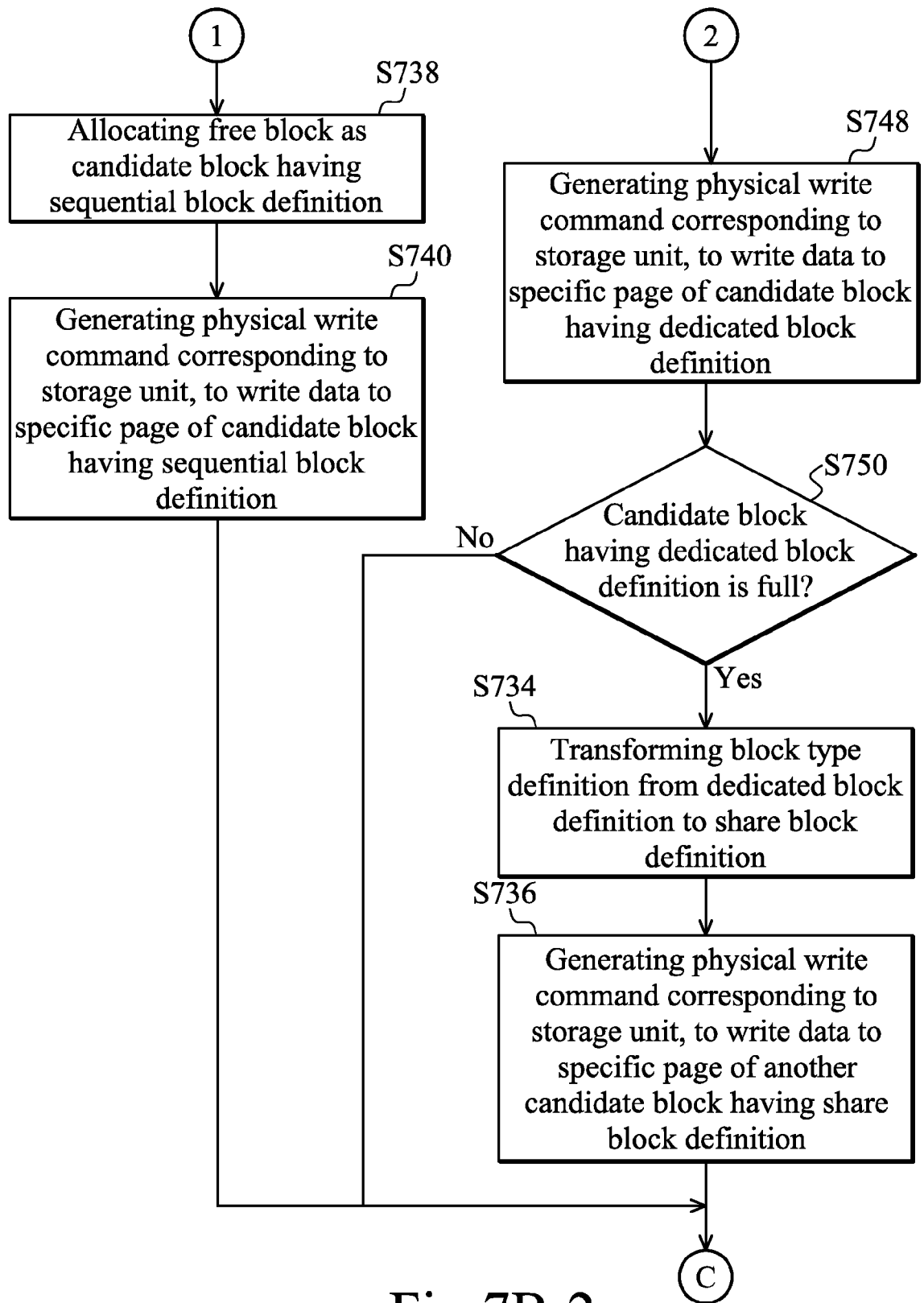
Figures 1, 7C:
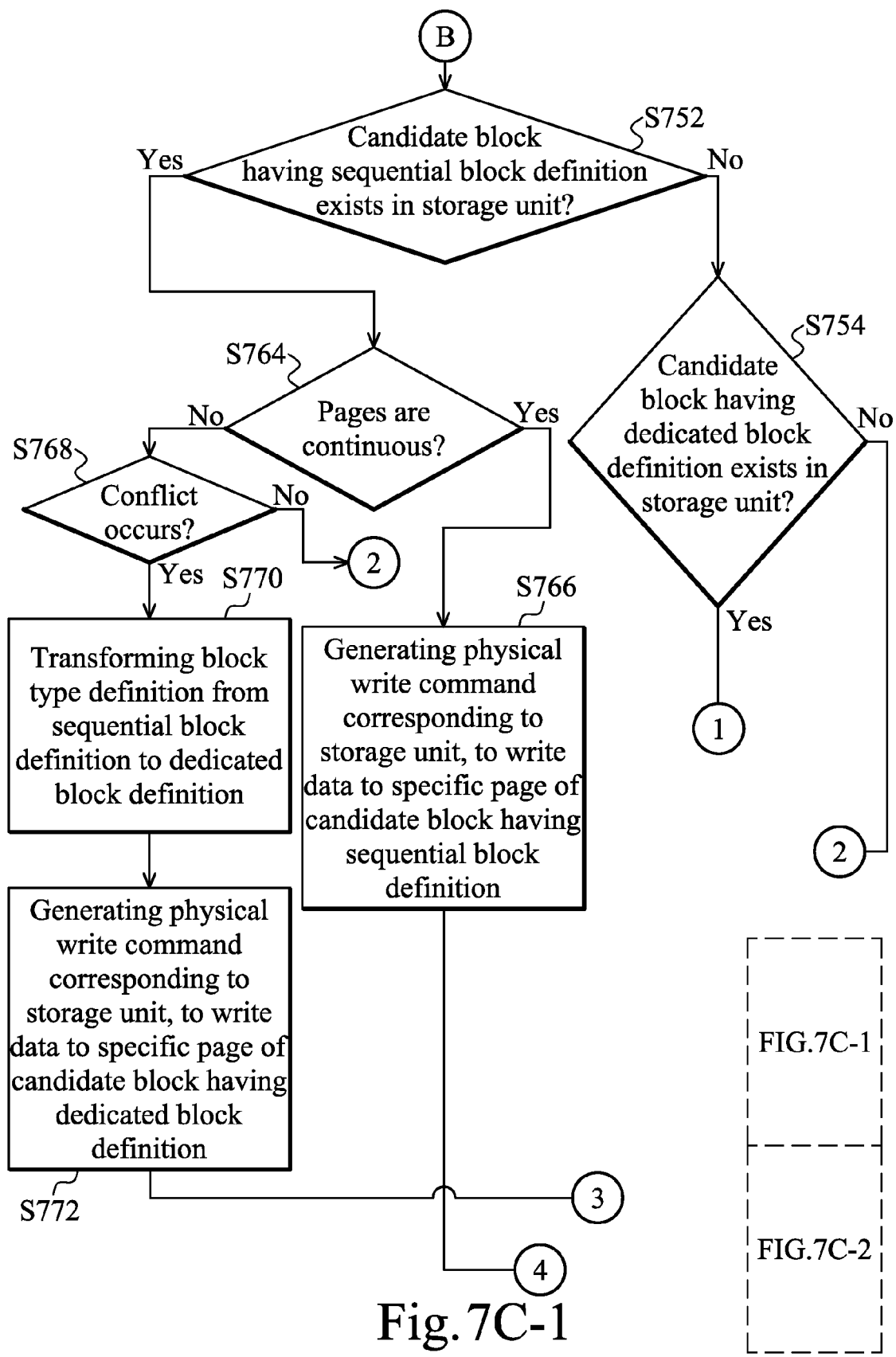
Figures 2, 7C:
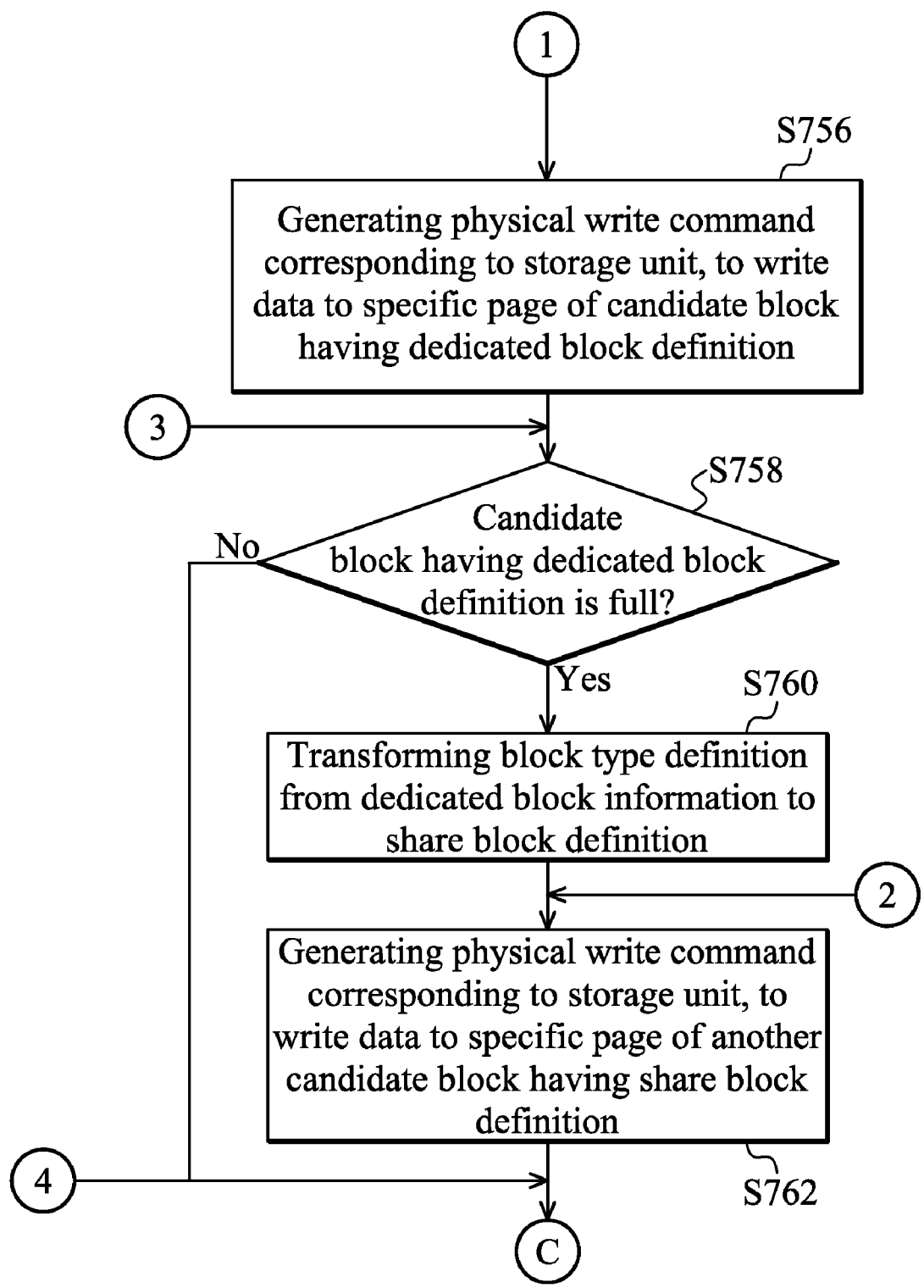
Figure 7D:
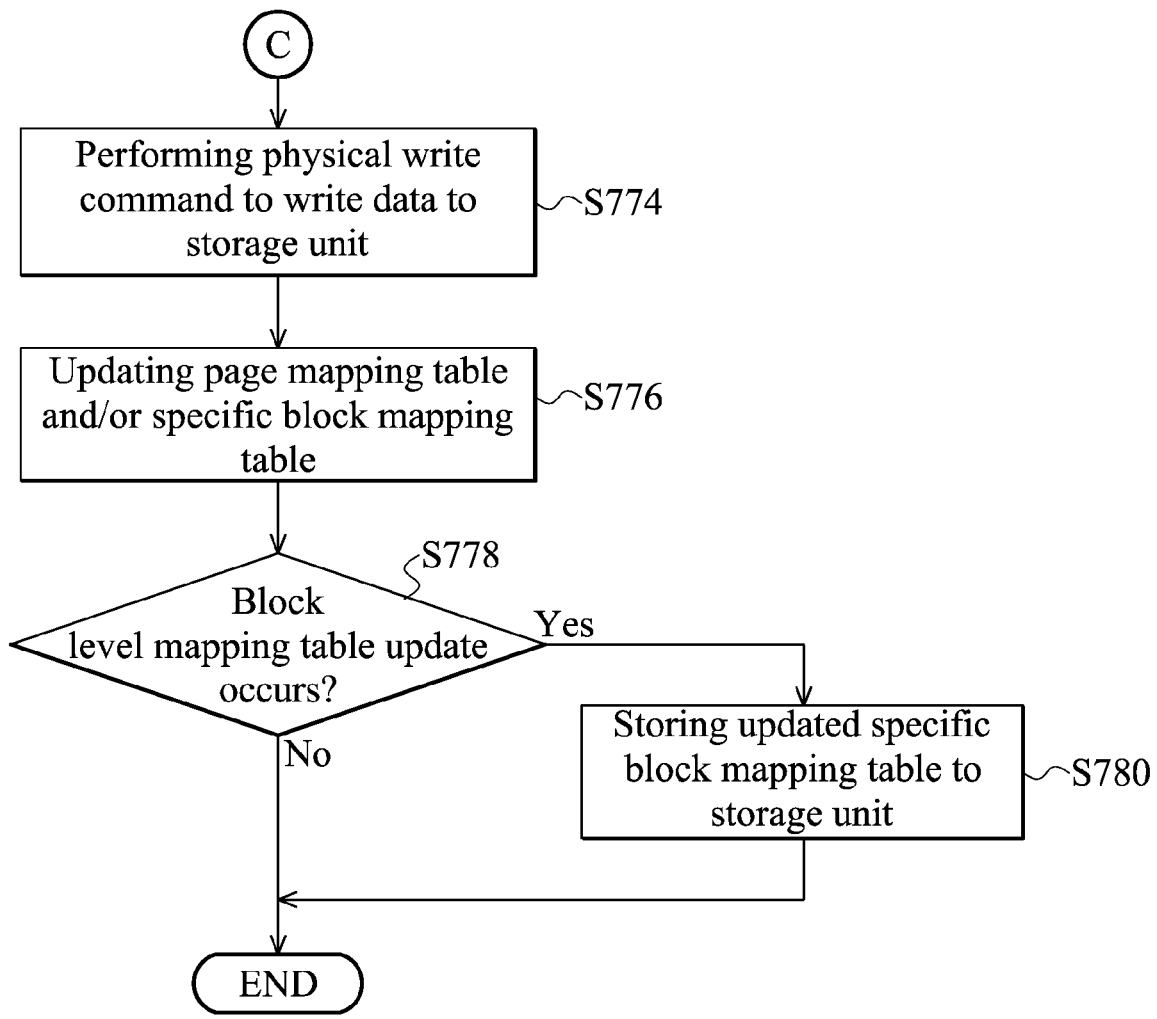

In step S728 (FIG. 7A-2), it is determined whether the requested logic page (logic page requested to be written with data) comprises the first page of the corresponding logic block according to the sub-write command. If so (Yes in step S728), in step S730 (FIG. 7B-1), it is determined whether a candidate block having the sequential block definition exists in the storage unit. If no candidate block having the sequential block definition exists in the storage unit (No in step S730), in step S732, it is determined whether a candidate block having the dedicated block definition exists in the storage unit. If the candidate block having the dedicated block definition exists in the storage unit (Yes in step S732), in step S733, the block type definition of the candidate block is transformed from the dedicated block definition to the share block definition, then goes to step S738 (FIG. 7B-2). In step S738, another free block is allocated as a candidate block having the sequential block definition, and in step S740, a physical write command corresponding to the storage unit is generated according to the sub-write command, thus to write data to the specific page of the candidate block having the sequential block definition. Then, the procedure goes to step S774 (FIG. 7D). If no candidate block having the dedicated block definition exists in the storage unit (No in step S732), then directly goes to step S738 and S740 (FIG. 7B-2).

If the candidate block having the sequential block definition exists in the storage unit (Yes in step S730 of FIGS. 7B-1), in step 742, it is determined whether the candidate block is full or is close to full. If the candidate block is full or is close to full (Yes in step S742), in step S744, the block type definition of the candidate block is transformed from the sequential block definition to the data block definition, and the operations of steps S738 and S740 (FIGS. 7B-2) are performed. If the candidate block is not full or is not close to full (No in step S742 of FIGS. 7B-1), in step S746, the block type definition of the candidate block is transformed from the sequential block definition to the dedicated block definition, and in step S748 (FIGS. 7B-2), a physical write command corresponding to the storage unit is generated according to the sub-write command, thus to write data to the specific page of the candidate block having the dedicated block definition. Then, in step S750, it is determined whether the candidate block having the dedicated block definition is full. If the candidate block having the dedicated block definition is full (Yes in step S750), the operations of step S734 and S736 are performed. In step S734, the block type definition of the candidate block is transformed from the dedicated block definition to the share block definition, and in step S736, a physical write command corresponding to the storage unit is generated according to the sub-write command, thus to write data to the specific page of another candidate block having the share block definition, which shares the physical block with the remaining requesting pages and pages of another logic block. Then, the procedure goes to step S774 (FIG. 7D). If the candidate block having the dedicated block definition is not full (No in step S750 of FIGS. 7B-2), the procedure directly goes to step S774 (FIG. 7D). It is understood that, the determination of step S750 must be performed since the number of the logic pages requested to be written with data by the sub-write command may exceed the page number that can be provided by the candidate block having the dedicated block definition.

If the logic page requested to be written with data by the sub-write command does not comprise the first page of the corresponding logic block (No in step S728 of FIGS. 7A-2), in step S752 (FIG. 7C), it is determined whether a candidate block having the sequential block definition exists in the storage unit. If no candidate block having the sequential block definition exists in the storage unit (No in step S752), in step S754, it is determined whether a candidate block having the dedicated block definition exists in the storage unit. If no candidate block having the dedicated block definition exists in the storage unit (No in step S754), the procedure goes to step S762 (FIGS. 7C-2). If the candidate block having the dedicated block definition exists in the storage unit (Yes in step S754 of FIGS. 7C-1), in step S756 (FIGS. 7C-2), a physical write command corresponding to the storage unit is generated according to the sub-write command, thus to write data to the specific page of the candidate block having the dedicated block definition. Then, in step S758, it is determined whether the candidate block having the dedicated block definition is full. If the candidate block having the dedicated block definition is full (Yes in step S758), in step S760, the block type definition of the candidate block is transformed from the dedicated block definition to the share block definition, and in step S762, a physical write command corresponding to the storage unit is generated according to the sub-write command, thus to write data to the specific page of another candidate block having the share block definition, which shares the physical block with the remaining requesting pages and pages of another logic block. Then, the procedure goes to step S774 (FIG. 7D). If the candidate block having the dedicated block definition is not full (No in step S758 of FIGS. 7C-2), the procedure directly goes to step S774.

If the candidate block having the sequential block definition exists in the storage unit (Yes in step S752 of FIGS. 7C-1), in step S764, it is determined whether the requested logic page is continuous with the last page among the pages with data in the candidate block. If so (Yes in step S764), in step S766, a physical write command corresponding to the storage unit is generated according to the sub-write command, thus to write data to the specific page of the candidate block having the sequential block definition. If not (No in step S764), in step S768, it is determined whether the address of the requested logic page conflicts with the address of the last page among the pages with data in the candidate block (that is, to determine whether the LBA of the requested logic page is less than the address of the last page among the pages with data in the candidate block). If no conflict occurs (No in step S768 of FIGS. 7C-1), the procedure goes to step S762 (FIGS. 7C-2). Because the pages of the block of a high capacity storage unit, such as a NAND flash memory, cannot be randomly written, but must be written in sequence, then when no conflict occurs (No in step S768 of FIGS. 7C-1), that is the LBA of the requested logic page is larger than the LBA of the last page, then the data is written to the specific page of another candidate block having the share block definition, that is the procedure goes to step S762 (FIGS. 7C-2). If the conflict occurs (Yes in step S768 of FIGS. 7C-1), in step S770, the block type definition of the candidate block is transformed from the sequential block definition to the dedicated block definition, and in step S772, a physical write command corresponding to the storage unit is generated according to the sub-write command, thus to write data to the specific page of the candidate block having the dedicated block definition. Then, the procedure goes to step S758 (FIGS. 7C-2).

Thereafter, in step S774 (FIG. 7D), the generated physical write command is performed to write data to the specific page in the storage unit. It is understood that, as described, the sub-write command may further comprise the device number and/or the sector offset. When the sub-write data comprises the device number and/or the sector offset, the data can be further written to the storage unit according to the device number and/or the sector offset. In step S776, the page mapping table and/or the specific block mapping table is updated according to the relationship between the logic page of the logic block requested by the sub-write command and the specific page of the candidate block in the physical storage unit. In step S778, it is determined whether the update of the mapping table in step S776 involves a block level mapping table update. If not (No in step S778), the procedure is completed. If so (Yes in step S778), in step S780, the updated specific block mapping table is written to the storage unit.

Therefore, the storage unit management methods and systems can manage the physical blocks of the storage unit in various classifications, thus efficiently utilizing the storage unit.

Storage unit management methods and systems, or certain aspects or portions thereof, may take the form of a software translation layer used between the file system of the host and the non-volatile memory (i.e., program code) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A storage unit management method, comprising:
providing a storage unit comprising a plurality of physical blocks, wherein each has one of a plurality of block type definitions;
obtaining a sub-write command requesting to write data to at least one logical page of a logical block;
determining whether a candidate block having a sequential block definition exists in the storage unit, wherein the logical page of the logical block cannot map to the candidate block based on the sequential block definition;
if the candidate block exists, transforming the block type definition of the candidate block from the sequential block definition to a dedicated block definition;
writing data to a specific page of the candidate block having the dedicated block definition, and recording a mapping relationship between the logical page of the logical block and the specific page of the candidate block, wherein the sub-write command comprises mapping directory number, block offset and page offset;
locating a specific block mapping table from a plurality of block mapping tables according to the mapping directory number;
locating a first specific entry from the specific block mapping table according to the block offset, wherein the first specific entry comprises a mapping mode setting and a block information; and
when the mapping mode setting indicates a page mapping mode, locating a second specific entry from a page mapped block table according to the block information of the first specific entry, wherein the second entry of the page mapped block table records a beginning address of a specific page mapping table.

2. The method of claim 1, further comprising the steps of:
when the mapping mode setting indicates the page mapping mode, locating the specific page mapping table corresponding to a specific page mapping block from a plurality of page mapping tables according to the second specific entry; and
updating the specific block mapping table or the page mapping table according to the mapping relationship.

3. The method of claim 2, further comprising:
determining whether the specific block mapping table is in a memory according to the mapping directory number;
when the specific block mapping table is not in the memory, selecting a candidate block mapping table from the plurality of block mapping tables in the memory; and
loading the specific block mapping table to the memory to replace the candidate block mapping table.

4. The method of claim 2, further comprising adding a free entry to the page mapped block table when the mapping mode setting indicates a block mapping mode.

5. The method of claim 1, further comprising:
converting the sub-write command into at least one physical write command for the storage unit according to the mapping relationship; and
executing the physical write command to write the data to the specific page of the candidate block in the storage unit.

6. The method of claim 1, wherein the block type definitions comprise a data block definition, said sequential block definition, said dedicated block definition, and a share block definition,
wherein a physical block having the data block definition stores data according to the block mapping mode, and all pages in the physical block having the data block definition have been written with data,
a physical block having the sequential block definition stores data according to a block mapping mode in a plurality of pages which is starting from the first page, and comprises at least one page that has not been written with data,
a physical block having the dedicated block definition stores data corresponds to a single logical block, stores data according to the block mapping mode in the plurality of pages which is starting from the first page, and comprises at least one page that store data according to the page mapping mode,
and a physical block having the share block definition stores data according to the page mapping mode, and the data in the physical block having the share block definition corresponds to at least two specific logical blocks.

7. The method of claim 6, further comprising:
   determining whether the at least one logical page comprises a first page of the logical block;
   if the at least one logical page comprises the first page of the logical block, determining whether the candidate block having the sequential block definition exists in the storage unit;
   if the candidate block having the sequential block definition exists in the storage unit, transforming the block type definition of the candidate block from the sequential block definition to the dedicated block definition, thus to store the data in the specific page of the candidate block;
   if no candidate block having the sequential block definition exists in the storage unit, allocating a free block as the candidate block having the sequential block definition, thus to store the data in the specific page of the candidate block having the sequential block definition.

8. The method of claim 7, wherein when no candidate block having the sequential block definition exists in the storage unit, the method further comprises the steps of:
   determining whether the candidate block having the dedicated block definition exists in the storage unit;
   if the candidate block having the dedicated block definition exists in the storage unit, transforming the block type definition of the candidate block from the dedicated block definition to the share block definition.

9. The method of claim 7, wherein when the candidate block having the sequential block definition exists in the storage unit, and after the block type definition of the candidate block is transformed from the sequential block definition to the dedicated block definition, the method further comprises the steps of:
   determining whether the candidate block having the dedicated block definition is full; and
   if the candidate block having the dedicated block definition is full, transforming the block type definition of the candidate block from the dedicated block definition to the share block definition, thus to store the data in the specific page of another candidate block having the share block definition.

10. The method of claim 6, further comprises the steps of determining whether the at least one logical page comprises a first page of the logical block;
   if the logical page does not comprise the first page of the logical block, determining whether the candidate block having the sequential block definition exists in the storage unit;
   if no candidate block having the sequential block definition exists in the storage unit, determining whether the candidate block having the dedicated block definition exists in the storage unit;
   if the candidate block having the dedicated block definition exists in the storage unit, storing the data in the specific page of the candidate block; and
   if no candidate block having the dedicated block definition exists in the storage unit, storing the data in the specific page of a candidate block having the share block definition.

11. The method of claim 10, wherein when the candidate block having the dedicated block definition exists in the storage unit, the method further comprises the steps of:
   determining whether the candidate block having the dedicated block definition is full; and
   if the candidate block having the dedicated block definition is full, transforming the block type definition of the candidate block from the dedicated block definition to the share block definition, thus to store the data in the specific page of another candidate block having the share block definition.

12. The method of claim 10, wherein when the candidate block having the sequential block definition exists in the storage unit, the method further comprises the steps of:
   determining whether the logical page is continuous with the last page among the pages with data in the candidate block;
   if the logical page is continuous with the last page among the pages with data in the candidate block, storing the data in the specific page of the candidate block;
   if the logical page is not continuous with the last page among the pages with data in the candidate block, determining whether an address of the logical page conflicts with an address of the last page among the pages with data in the candidate block;
   if no conflict occurs, storing the data in the specific page of another candidate block having the share block definition; and
   if a conflict occurs, transforming the block type definition of the candidate block from the sequential block definition to the dedicated block definition, thus to store the data in the specific page of the candidate block having the dedicated block definition.

13. The method of claim 12, after the step of storing the data in the specific page of the candidate block having the dedicated block definition, the method further comprises the steps of:
   determining whether the candidate block having the dedicated block definition is full; and
   if the candidate block having the dedicated block definition is full, transforming the block type definition of the candidate block from the dedicated block definition to the share block definition, thus to store the data in the specific page of another candidate block having the share block definition.

14. The method of-claim 2, further comprising storing the updated specific block mapping table to the storage unit.

15. A storage unit management system, comprising:
   a storage unit comprising a plurality of physical blocks, wherein each has one of a plurality of block type definitions; and
   a processing module obtaining a sub-write command requesting to write data to at least one logical page of a logical block, determining whether a candidate block having a sequential block definition exists in the storage unit, wherein the logical page of the logical block cannot map to the candidate block based on the sequential block definition, if the candidate block exists, transforming the block type definition of the candidate block from the sequential block definition to a dedicated block definition, and writing data to a specific page of the candidate block having the dedicated block definition, and recording a mapping relationship between the logical page of the logical block and the specific page of the candidate block, wherein the sub-write command comprises mapping directory number, block offset and page offset, and the processing module further locates a specific block mapping table from a plurality of block mapping tables according to the mapping directory number, and locates a first specific entry from the specific block mapping table according to the block offset, wherein the first specific entry comprises a mapping mode setting and a block information, and when the mapping mode setting indicates a page mapping mode, the processing module locates a second specific entry from a page mapped block table according to the block information of the first specific entry, wherein the second entry of the page mapped block table records a beginning address of a specific page mapping table.

16. The system of claim 15, wherein when the mapping mode setting indicates the page mapping mode, -the processing module further locates the specific page mapping table corresponding to a specific page mapping block from a plurality of page mapping tables according to the second specific entry, and updates the specific block mapping table or the page mapping table according to the mapping relationship.

17. The system of claim 16, wherein the processing module further determines whether the specific block mapping table is in a memory according to the mapping directory number, and when the specific block mapping table is not in the memory, selects a candidate block mapping table from the plurality of block mapping tables in the memory, and loads the specific block mapping table to the memory to replace the candidate block mapping table.

18. The system of claim 16, wherein the processing module further adds a free entry to the page mapped block table when the mapping mode setting indicates a block mapping mode.

19. The system of claim 15, wherein the processing module further converts the sub-write command into at least one physical write command for the storage unit according to the mapping relationship, and executes the physical write command to write the data to the specific page of the candidate block in the storage unit.

20. The system of claim 15, wherein the block type definitions comprise a data block definition, said sequential block definition, said dedicated block definition, and a share block definition, wherein a physical block having the data block definition stores data according to the block mapping mode, and all pages in the physical block having the data block definition have been written with data, a physical block having the sequential block definition stores data according to a block mapping mode in a plurality of pages which is starting from the first page, and comprises at least one page that has not been written with data, a physical block having the dedicated block definition stores data corresponds to a single logical block, stores data according to the block mapping mode in the plurality of pages which is starting from the first page, and comprises at least one page that store data according to the page mapping mode, and a physical block having the share block definition stores data according to the page mapping mode, and the data in the physical block having the share block definition corresponds to at least two specific logical blocks.

21. The system of claim 20, wherein the processing module further determines whether the at least one logical page comprises a first page of the logical block, if the at least one logical page comprises the first page of the logical block, determines whether the candidate block having the sequential block definition exists in the storage unit, if the candidate block having the sequential block definition exists in the storage unit, transforms the block type definition of the candidate block from the sequential block definition to the dedicated block definition, thus to store the data in the specific page of the candidate block, if no candidate block having the sequential block definition exists in the storage unit, allocates a free block as the candidate block having the sequential block definition, thus to store the data in the specific page of the candidate block having the sequential block definition.

22. The system of claim 21, wherein when no candidate block having the sequential block definition exists in the storage unit, the processing module further determines whether the candidate block having the dedicated block definition exists in the storage unit, if the candidate block having the dedicated block definition exists in the storage unit, transforms the block type definition of the candidate block from the dedicated block definition to the share block definition.

23. The system of claim 21, wherein when the candidate block having the sequential block definition exists in the storage unit, and after the block type definition of the candidate block is transformed from the sequential block definition to the dedicated block definition, the processing module further determines whether the candidate block having the dedicated block definition is full, and if the candidate block having the dedicated block definition is full, transforms the block type definition of the candidate block from the dedicated block definition to the share block definition, thus to store the data in the specific page of another candidate block having the share block definition.

24. The system of claim 20, wherein the processing module further determines whether the at least one logical page comprises a first page of the logical block, if the logical page does not comprise the first page of the logical block, determines whether the candidate block having the sequential block definition exists in the storage unit, if no candidate block having the sequential block definition exists in the storage unit, determines whether the candidate block having the dedicated block definition exists in the storage unit, if the candidate block having the dedicated block definition exists in the storage unit, stores the data in the specific page of the candidate block, and if no candidate block having the dedicated block definition exists in the storage unit, stores the data in the specific page of a candidate block having the share block definition.

25. The system of claim 24, wherein when the candidate block having the dedicated block definition exists in the storage unit, the processing module further determines whether the candidate block having the dedicated block definition is full, and if the candidate block having the dedicated block definition is full, transforms the block type definition of the candidate block from the dedicated block definition to the share block definition, thus to store the data in the specific page of another candidate block having the share block definition.

26. The system of claim 24, wherein when the candidate block having the sequential block definition exists in the storage unit, the processing module further determines whether the logical page is continuous with the last page among the pages with data in the candidate block, if the logical page is continuous with the last page among the pages with data in the candidate block, stores the data in the specific page of the candidate block, if the logical page is not continuous with the last page among the pages with data in the candidate block, determines whether an address of the logical page conflicts with an address of the last page among the pages with data in the candidate block, if no conflict occurs, stores the data in the specific page of another candidate block having the share block definition, and if a conflict occurs, transforms the block type definition of the candidate block from the sequential block definition to the dedicated block definition, thus to store the data in the specific page of the candidate block having the dedicated block definition.

27. The system of claim 26, wherein after storing the data in the specific page of the candidate block having the dedicated block definition, the processing module further determines whether the candidate block having the dedicated block definition is full, and if the candidate block having the dedicated block definition is full, transforms the block type definition of the candidate block from the dedicated block definition to the share block definition, thus to store the data in the specific page of another candidate block having the share block definition.

28. The system of claim 16, wherein the processing module further stores the updated specific block mapping table to the storage unit.

* * * * *